United States Patent [19]

Fancy

[11] 4,211,430
[45] Jul. 8, 1980

[54] PASSIVE LAP AND SHOULDER BELT SYSTEM

[75] Inventor: Richard E. Fancy, Rochester, Mich.

[73] Assignee: General Motors Corporation, Detroit, Mich.

[21] Appl. No.: 24,108

[22] Filed: Mar. 26, 1979

[51] Int. Cl.² .............................................. B60R 21/02
[52] U.S. Cl. ................................................... 280/802
[58] Field of Search ................ 280/802, 803; 297/388, 297/389

[56] References Cited

U.S. PATENT DOCUMENTS

| | | | |
|---|---|---|---|
| 3,679,229 | 7/1972 | Weststrate | 280/803 |
| 3,680,883 | 8/1972 | Keppel et al. | 280/804 |
| 3,770,078 | 11/1973 | Keppel et al. | 280/804 |
| 3,815,934 | 6/1974 | Weststrate | 280/802 |
| 4,124,224 | 11/1978 | Matsuoka | 280/802 |
| 4,138,142 | 2/1979 | Wize | 280/802 |
| 4,159,834 | 7/1979 | Miller et al. | 280/802 |

*Primary Examiner*—Robert R. Song
*Attorney, Agent, or Firm*—Charles E. Leahy

[57] ABSTRACT

A passive three-point lap and shoulder belt system has lap and shoulder belt retractors mounted on the lower rear corner of the door. The shoulder belt is slidable through an anchor loop mounted on the upper rear corner of the door. The inboard ends of the lap and shoulder belts are joined together at the juncture which is connected to a control belt mounted inboard the seat by an inboard retractor. The winding effort of the shoulder belt retractor is greater than the winding effort of both the lap belt retractor and the inboard retractor to locate the juncture of the lap and shoulder belts adjacent the anchor loop so that the lap belt is stowed vertically along the door and the control belt extends diagonally between the inboard retractor and the juncture of the lap and shoulder belts. The inboard retractor has a motor and a latch mechanism which forcibly retract and hold the control belt against the effort of the shoulder belt retractor when the door is closed to position the lap and shoulder belt juncture at the inboard retractor and thereby establish the shoulder belt and lap belt in their restraining positions. When the door is opened the latch mechanism unlocks the control belt for extension by the greater retracting effort of the shoulder belt retractor so that the juncture of the lap and shoulder belts is returned to the door mounted shoulder height anchor loop to lift the lap belt off the occupant.

3 Claims, 3 Drawing Figures

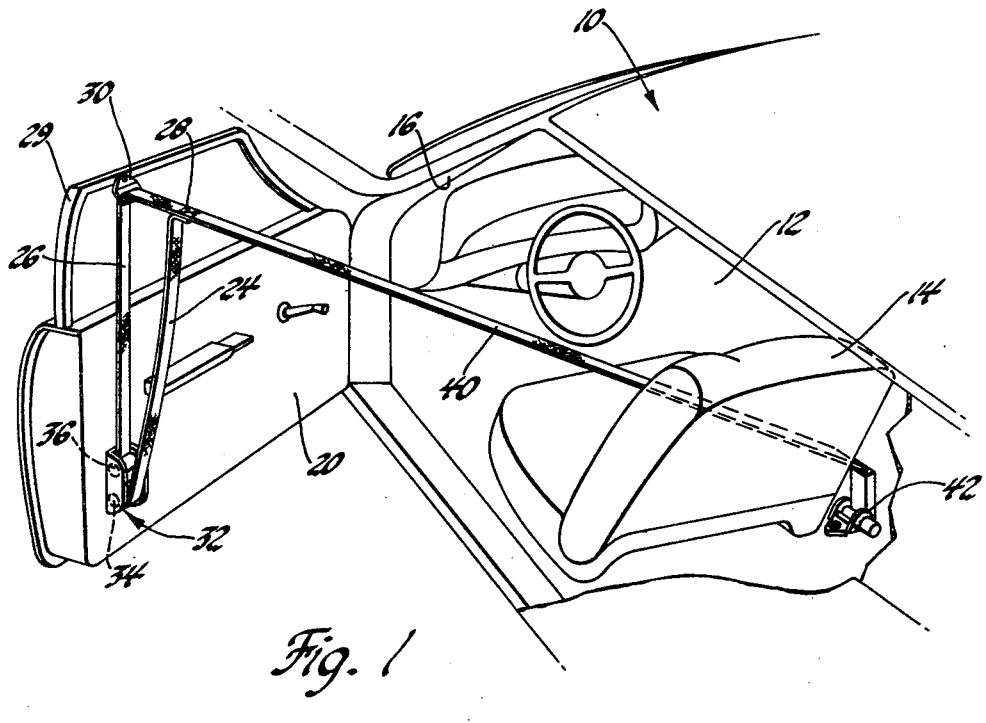
Fig. 1
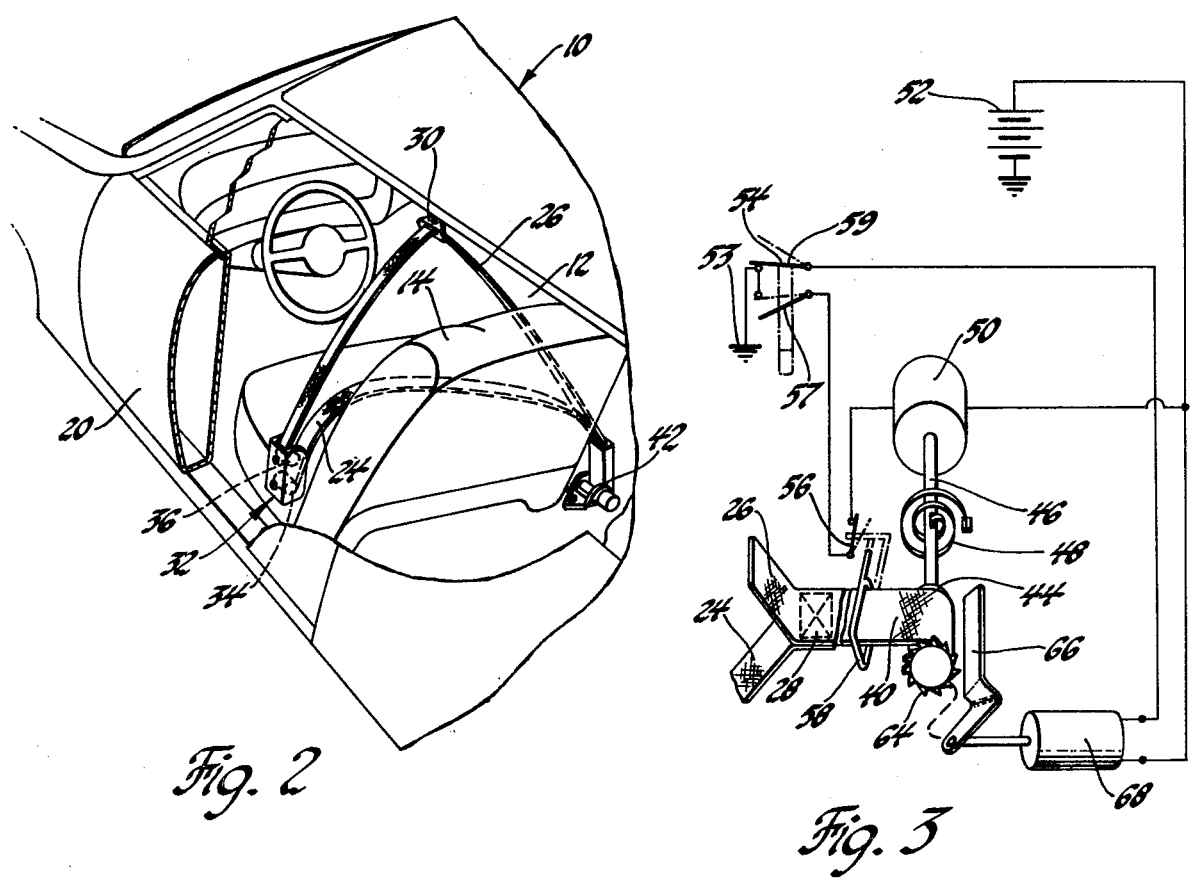
Fig. 2
Fig. 3

PASSIVE LAP AND SHOULDER BELT SYSTEM

The invention relates to a passive occupant restraining lap and shoulder belt system.

BACKGROUND OF THE INVENTION

It is well known in motor vehicles to restrain an occupant in the seat by a lap belt disposed across the lap and a shoulder belt disposed diagonally across the chest. It is also known to connect the outboard belt ends to the door so that the belt is automatically moved between a restraining position about the occupant and a stowed position forwardly of the seat in response to movement of the door between open and closed positions. It is common in such passive belt systems to connect the outboard end of the lap belt to the door generally adjacent the hip of the occupant.

It has been recognized as desirable to move the outboard lap belt end forwardly and/or upwardly upon opening of the door to facilitate occupant ingress or egress. U.S. Pat. No. Keppel et al 3,680,883, issued Aug. 1, 1972, and assigned to the assignee of this invention, provides a track on the door having a guide loop traveling therein to move the outboard lap belt end forwardly and upwardly upon opening of the door.

Other prior art devices such as U.S. Pat. Nos. Westrate et al 3,815,934, issued June 11, 1974 and Keppel et al 3,770,078, issued Nov. 6, 1973, and assigned to the assignee of this invention, provide a reel driven by a motor or a door responsive drive mechanism which winds a cord attached to the lap belt to pull the lap belt forwardly and upwardly upon opening movement of the door.

Another prior art device of Pat. No. 4,138,142 by Wize provides a door mounted passive three-point lap and shoulder belt system wherein the unwinding of the shoulder belt from a door mounted retractor adjacent the hip of the occupant and toward a door mounted shoulder height anchor loop in response to opening movement of the door lifts the lap belt along the door and off the lap of the occupant to a stowed position generally parallel with the shoulder belt.

BRIEF SUMMARY OF THE INVENTION

The present invention provides a new and improved lap and shoulder belt system which further facilitates occupant access by lifting the lap belt off the lap of the occupant and stowing the lap belt in a vertical position adjacent the door.

According to the present invention a passive three-point lap and shoulder belt system has lap and shoulder belt retractors mounted on the lower rear corner of the door generally adjacent the occupant hip. The shoulder belt is slidable through an anchor loop mounted on the upper rear corner of the door generally adjacent the shoulder of the occupant. The inboard ends of the lap and shoulder belts are joined together at the juncture which is connected to a control belt mounted on the vehicle body inboard the seat by an inboard retractor. The winding effort of the shoulder belt retractor is greater than the winding effort of both the lap belt retractor and the inboard retractor so that the juncture of the lap and shoulder belts is normally positioned adjacent the anchor loop to stow the lap belt vertically along the door and extend the control belt diagonally between the inboard retractor and the anchor loop. An electric motor or other drive means associated with the inboard retractor forcibly retracts the control belt against the effort of the shoulder belt retractor when the door is closed to thereby position the lap and shoulder belt juncture at the inboard retractor and establish the shoulder belt and lap belt in their respective restraining positions. A latching mechanism is associated with the inboard retractor for locking the control belt against extension by the greater retracting effort of the shoulder belt retractor when the door is closed. When the door is opened the latch mechanism unlocks the control belt for extension by the greater retracting effort of the shoulder belt retractor so that the juncture of the lap and shoulder belts is returned to the door mounted shoulder height anchor loop, lift the lap belt off the occupant lap and stow the lap belt vertically along the door.

Accordingly, the object, feature, and advantage of the invention resides in the provision of a belt system wherein the door mounted shoulder belt retractor has a larger retracting effort than the door mounted lap belt retractor and an inboard mounted control belt retractor so that the juncture of the lap and shoulder belts is lifted to shoulder height adjacent the door to establish the lap belt in a stowed position along the door and extend the control belt diagonally from shoulder height on the door to the inboard retractor.

Another object, feature, and advantage of the invention resides in the provision of lap and shoulder belts respectively mounted on the door by lap and shoulder belt retractors and a control belt extending from the juncture of the lap and shoulder belts to an inboard retractor having associated drive means adapted to retract the control belt and extend the lap and shoulder belts when the door is closed to establish the belt juncture inboard the seat and thereby dispose the lap and shoulder belts in their respective restraining positions across the body of the occupant.

BRIEF DESCRIPTION OF THE DRAWINGS

These and other objects, features, and advantages of the invention will become apparent upon consideration of the specification and the appended drawings in which:

FIG. 1 is a perspective view of a motor vehicle occupant compartment having a belt system according to the invention with the lap and shoulder belts shown in the stowed position to facilitate occupant access when the vehicle door is open;

FIG. 2 is a view similar to FIG. 1 except that the lap and shoulder belts are shown in the occupant restraining position when the door is closed; and FIG. 3 shows a schematic representation of the inboard retractor and an electrical circuit for controlling the motor and the latch mechanism of the inboard retractor.

DESCRIPTION OF THE PREFERRED EMBODIMENT

Referring to FIG. 1, the vehicle body generally indicated at 10 defines a passenger compartment 12 in which an occupant seat 14 is provided for seating an occupant. The vehicle body has a door opening 16 which is selectively closed by a door 20 having its forward end pivoted to the vehicle body.

As seen in FIG. 1, the seat belt system includes a lap belt 24 and a shoulder belt 26. The inboard ends of lap belt 24 and shoulder belt 26 are joined together at a belt juncture 28. The shoulder belt 26 is slidable through an anchor loop 30 mounted on the window frame 29 of the door 20.

A retractor assembly generally indicated at 32 is attached to the lower rear corner of the door generally adjacent the hip of the occupant and includes a lap belt reel 34 to which the end of the lap belt 24 is attached and a shoulder belt reel 36 to which the end of shoulder belt 26 is attached. The reels 34 and 36 have associated winding springs, not shown, which rotate the reels in the direction to wind the lap and shoulder belts thereon. The winding spring associated with the shoulder belt reel 36 has a higher retracting effort than the winding spring of the lap belt reel 34 so that the juncture 28 of lap belt 24 and shoulder belt 26 is drawn toward the anchor loop 30 to stow the lap and shoulder belts in generally parallel relation along the door 20.

Conventional pawl and ratchet latching mechanisms, not shown, are provided to lock the reels 34 and 36 against the belt unwinding rotation. The latching mechanism may be of the inertia actuated type such as U.S. Pat. No. Griffin 3,831,878, issued Aug. 22, 1974 and incorporated herein by reference. The latching mechanism may be connected to the door handle as in U.S. Pat. Nos. Keppel et al 3,770,078, issued Nov. 6, 1973 or Arlauskas et al 3,692,328, issued Sept. 19, 1972 and incorporated herein by reference. Other suitable prior art retractor locking mechanisms may also be used.

The belt system also includes a control belt 40 which is attached to the lap and shoulder belts at juncture 28 and has an inboard end which is mounted by an inboard retractor 42 attached to the vehicle floor inboard the occupant seat 14. As best seen in the schematic representation of FIG. 3, the inboard retractor 42 includes a belt reel 44 upon which the control belt 40 is wound. The reel 44 is rotatably mounted by a reel shaft 46 which is rotated in the belt winding direction by a winding spring 48. The winding effort of winding spring 48 is less than the effort of the winding spring of shoulder belt reel 36 so that the control belt 40 will normally be extended from the inboard retractor 42 and the shoulder belt 26 will be wound upon the shoulder belt reel 36 to establish the belt juncture 28 adjacent the anchor loop 30 as shown in FIG. 1. The effort of winding spring 48 is sufficient to maintain the control belt 40 in the taut diagonal position shown in FIG. 1.

The inboard retractor 42 also has a drive mechanism associated therewith to forcibly wind the control belt 40 when the door is closed to establish the lap and shoulder belts in their respective restraining positions shown in FIG. 2. As seen in FIG. 3, the drive mechanism includes an electric motor 50 which is connected to the reel shaft 46. motor 50 is operated by an electrical circuit including a battery 52, a ground connection 53, a door operated switch 54 and a belt sensing switch 56. The door switch 54 has a set of contacts 57 which are open when the door is open and closed when the door is closed. The door switch 54 also has a set of contacts 59 which are closed when the door is open and are open when the door is closed. The belt sensing switch 56 is normally closed and opens when the belt juncture 28 reaches the inboard position of FIG. 2 and engages a switch arm 58 associated with the belt sensing switch 56.

The retractor 42 also has a latching mechanism including a ratchet plate 64 mounted on the reel 44, a pivotally mounted lockbar 66 which is spring biased into engagement with the ratchet plate 64, and an electrical solenoid 68 which is energizable to disengage the lockbar 66 from the ratchet plate 64. Solenoid 68 is controlled by contacts 59 of the door switch 54. The contacts 59 are closed when the door is open so that the solenoid 68 is energized to hold the lockbar 66 in its disengaged position of FIG. 3. When the door is closed the contacts 59 are opened to deenergize the solenoid 68 so that the lockbar 66 is spring biased into engagement with the ratchet 64.

OPERATION

When the door is open as shown in FIG. 1, the relatively large winding effort of the shoulder belt reel 36 winds the shoulder belt 26 against the lesser winding effort of the lap belt reel 34 and the inboard control belt retractor 42 so that the belt juncture 28 is located adjacent the anchor loop 30 and the lap belt 24 is vertically stowed in a non-obstructing position along the door. The winding spring 48 of the inboard retractor 42 winds and unwinds the control belt 40 to maintain the taut diagonal position of FIG. 1 during opening or closing movement of the door.

When the door 20 is moved from the open position of FIG. 1 to the closed position of FIG. 2 the winding spring 48 rotates reel 44 to wind the control belt 40. When the closing movement of door 20 actuates the door switch 54, the contacts 57 are closed to complete the electrical circuit between the battery 52 and the ground 53 so that the motor 50 is energized and forcibly rotates the reel 46 to wind the control belt 40 and extend lap belt 24 and shoulder belt 26 from their respective door mounted reels 34 and 36 to establish the belts in their restraining positions of FIG. 2. Simultaneously, the door closing actuation of the door switch 54 opens contacts 59 to deenergize solenoid 68 so that the lockbar 66 is immediately released for spring biased engagement with the ratchet plate 64 to lock the reel 46 against unwinding of the control belt 40 but permit further winding rotation of the reel 46.

When the door is fully closed and control belt 40 is fully wound, the belt juncture 28 engages the switch arm 58 and opens the belt sensing switch 56 to deenergize motor 50 and thereby terminate the winding of the control belt 40 by the retractor 42. Solenoid 68 remains deenergized so that the lockbar 66 continues in engagement of ratchet plate 64 to prevent the relatively greater winding effort of the shoulder belt reel 36 and the additional winding effort of the lap belt reel 34 from unwinding control belt 40 from the reel 46.

When the occupant wishes to alight from the vehicle, the door is opened. Opening movement of the door actuates the door switch 54 to close switch contacts 59 so that the solenoid 68 is energized to disengage the lockbar 66 from the ratchet plates 64 and permit unwinding rotation of reel 44. Simultaneously the switch contacts 57 are opened so that the motor 50 remains deenergized. The relatively greater winding effort of the winding spring associated with the shoulder belt reel 36 draws the belt juncture 28 to the position of FIG. 1 adjacent the guide loop 30. Accordingly, the lap belt 24 is lifted off the lap of the seated occupant to a vertical stowed position generally parallel with the door and the shoulder belt 26 as shown in FIG. 1.

It will be understood that the drive means associated with the inboard retractor 42 need not be an electrical motor as disclosed herein. For example, the drive means may be a pulley and cable arrangement which mechanically connect the retractor with the door to rotate the control belt reel 46 in unison with the pivotal movement of the door.

Whenever the belts are in their restraining positions of FIG. 2, the length of the lap belt 24 and shoulder belt 26 are adjustable by their respective reels 34 and 36 to fit a particular occupant and permit occupant movement in the seat. Furthermore, it will be understood that in some instances the lap belt retractor may be eliminated by simply attaching outboard end or a fixed length lap belt on the door.

Thus, it is seen that the invention provides a new and improved passive lap and shoulder belt system which facilitates occupant ingress and egress by lifting the lap belt off the lap of the seated occupant to a vertical stowed position generally parallel with the door.

The embodiments of a invention in which an exclusive property or privilege is claimed are defined as follows:

1. In combination with the vehicle body having an occupant compartment in which an occupant seat is accessible through a door opening selectively opened and closed by a movable door, a passive occupant restraining belt arrangement comprising:

a lap belt and shoulder belt having inboard ends joined together at a juncture and outboard ends;

first means retractably mounting the outboard lap belt end on the door generally adjacent the occupant hip;

second means retractably mounting the outboard shoulder belt end on the door substantially at occupant shoulder height, said second retracting means having a relatively greater retracting effort than the first retracting means so that the juncture of the lap and shoulder belts is normally established at shoulder height to stow the lap belt vertically along the door;

a control belt connected to the juncture of the lap and shoulder belts;

third means retractably mounting the control belt on the vehicle body inboard the occupant seat and having a retracting effort relatively less than the retracting effort of the second means so that the control belt extends diagonally between the third means and the shoulder height location of the lap and shoulder belt juncture;

and drive means associated with the third means to forcibly retract the control belt against the bias of the first and second means when the door is closed so that the juncture of the lap and shoulder belts is positioned inboard the occupant to establish the lap and shoulder belts in their respective occupant restraining positions.

2. In combination with a vehicle body having an occupant compartment in which an occupant seat is accessible through a door opening selectively opened and closed by a movable door, a passive occupant restraining belt arrangement comprising:

a lap belt and a shoulder belt having inboard ends joined together and outboard ends;

an anchor loop mounted on the door generally adjacent the shoulder of the occupant and slidably receiving the shoulder belt intermediate the inboard and outboard ends;

a lap belt retractor and a shoulder belt retractor mounted on the door for extending and retracting the outboard ends of the lap belt and the shoulder belt, said shoulder belt retractor having a higher retracting effort than the lap belt retractor to position the juncture of the lap and shoulder belts at the anchor loop and thereby lift the lap belt to a stowed position along the door;

a control belt connected to the juncture of the lap and shoulder belts;

an inboard retractor mounted on the vehicle body inboard the occupant seat for extending and retracting the control belt, and having a retracting effort less than the retracting effort of the shoulder belt retractor;

an electric motor associated with the inboard retractor for forcibly retracting the control belt;

and an electrical control circuit having a door operated switch for energizing the motor to forcibly retract the control belt when the door is closed to extend the lap and shoulder belts from their respective door-mounted retractors so that the shoulder belt is moved to a diagonal restraining position across the chest of the occupant and the lap belt is moved to a restraining position across the lap of the occupant.

3. In combination with a vehicle body having an occupant compartment in which an occupant seat is accessible through a door opening selectively opened and closed by a movable door, a passive occupant restraining belt arrangement comprising:

a lap belt and a shoulder belt having inboard ends joined together and outboard ends;

an anchor loop mounted on the door generally adjacent the shoulder of the occupant and slidably receiving the shoulder belt intermediate the inboard and outboard ends;

a lap belt retractor and a shoulder belt retractor mounted on the door for extending and retracting the outboard ends of the lap belt and the shoulder belt, said shoulder belt retractor having a higher retracting effort than the lap belt retractor to position the juncture of the lap and shoulder belts at the anchor loop and thereby lift the lap belt to a stowed position along the door;

a control belt connected to the juncture of the lap and shoulder belts;

an inboard retractor mounted on the vehicle body inboard the occupant seat for extending and retracting the control belt and having a retracting effort less than the winding effort of the shoulder belt so that the juncture of the lap and shoulder belt is normally positioned at the anchor loop to stow the lap belt vertically along the door;

drive means associated with the inboard retractor to retract the control belt when the door is closed to extend the lap and shoulder belts from their respective door mounted retractors so that the shoulder belt is moved to a diagonally restraining position across the chest of the occupant and the lap belt is moved to a restraining position across the lap of the occupant;

latch means associated with the inboard retractor for selectively latching the retractor against extension of the control belt therefrom;

and control means adapted to engage the latch means when the door is closed so that the shoulder belt is held extended against the relatively large retracting effort of the shoulder belt retractor.

* * * * *